US005435611A

United States Patent [19]

Campbell et al.

[11] Patent Number: 5,435,611

[45] Date of Patent: Jul. 25, 1995

[54] ALUMINUM CAN HANDLING TONGS

[76] Inventors: David K. Campbell, P.O. Box 6112, Concord, Calif. 94514; Charles M. Campbell, 970 Getoun Dr., Concord, Calif. 94518-3334

[21] Appl. No.: 273,232

[22] Filed: Jul. 11, 1994

[51] Int. Cl.$^{6}$ .............................. B25B 7/02; B25J 1/02

[52] U.S. Cl. .............................. 294/16; 294/28; 294/118; 294/902

[58] Field of Search .............................. 294/3, 8.5, 11, 16, 294/28, 29, 31.1, 50.6, 50.8, 50.9, 104, 106, 118, 902

[56] References Cited

U.S. PATENT DOCUMENTS

| | | | |
|---|---|---|---|
| 282,134 | 7/1883 | Ward | 294/16 X |
| D. 298,600 | 11/1988 | Dallaire . | |
| 659,518 | 10/1900 | Estlack | 294/50.8 |
| 1,493,362 | 5/1924 | Martelli | 294/106 |
| 1,762,486 | 6/1930 | Roden | 294/118 |
| 2,559,978 | 7/1951 | Marco | 294/28 |
| 2,747,912 | 5/1956 | Franklin | 294/28 X |
| 2,852,302 | 9/1958 | Steffen | 294/50.8 X |
| 3,153,554 | 10/1964 | Beihl | 294/28 |
| 3,292,963 | 12/1966 | Materyn | 294/29 |
| 3,692,347 | 9/1972 | Bixler | 294/50.8 |
| 4,572,566 | 2/1986 | Terrington | 294/16 X |
| 4,606,569 | 8/1986 | Dunn et al. . | |
| 4,682,803 | 7/1987 | Andrews . | |
| 4,728,138 | 3/1988 | Samuelsson . | |
| 4,972,602 | 11/1990 | Howes . | |

FOREIGN PATENT DOCUMENTS

| | | | |
|---|---|---|---|
| 16884 | 10/1980 | European Pat. Off. | 294/16 |
| 573752 | 6/1924 | France | 294/11 |
| 170264 | 9/1934 | Switzerland | 294/16 |

*Primary Examiner*—Johnny D. Cherry

[57] ABSTRACT

First and second legs are pivotally mounted in a scissor-like relationship about an adjustable pivot axle, wherein an outermost end of the legs have cooperative first and second jaws having facing mirror image surfaces arranged to secure aluminum cans.

5 Claims, 1 Drawing Sheet

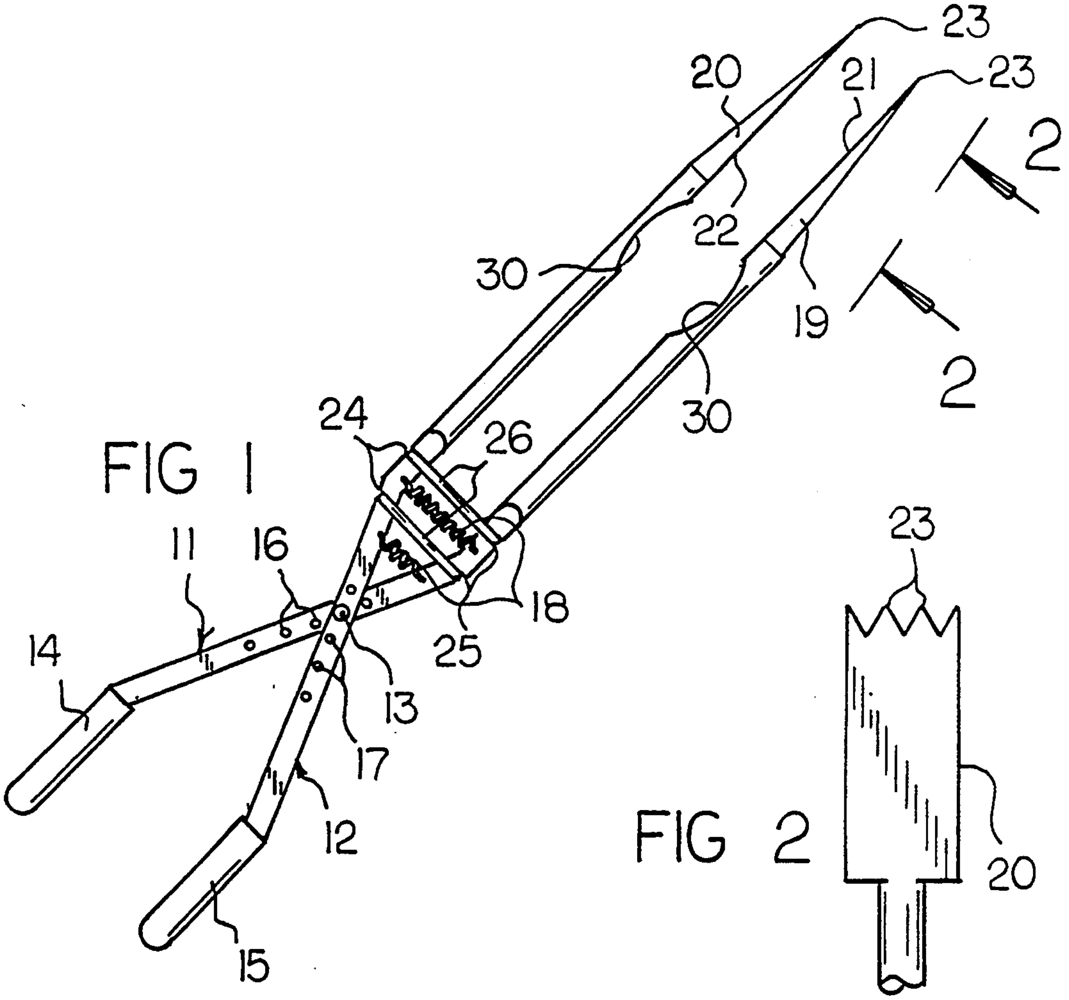
FIG 1
FIG 2
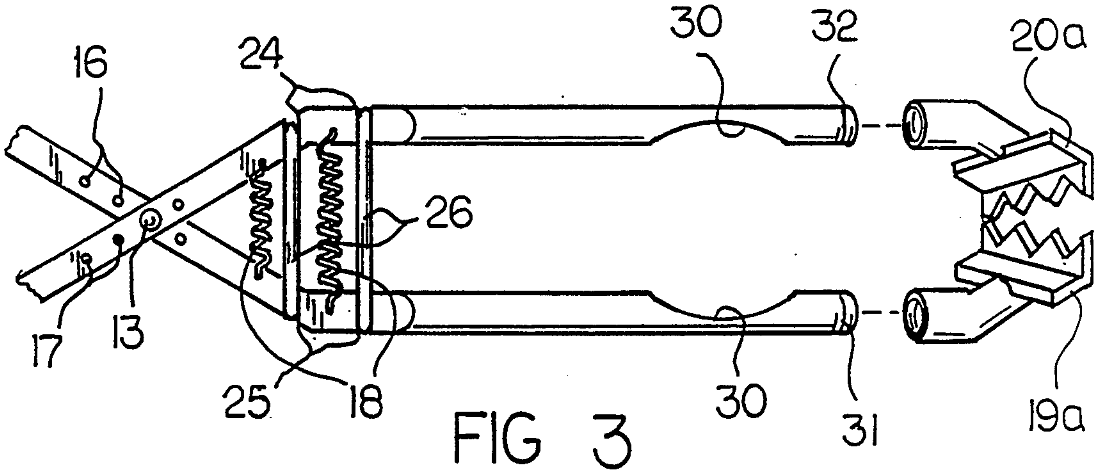
FIG 3

ALUMINUM CAN HANDLING TONGS

BACKGROUND OF THE INVENTION

1. Field of the Invention

The field of invention relates to tong apparatus, and more particularly pertains to new aluminum can handling tongs wherein the same is arranged for the grasping of aluminum cans and particularly the retrieving of aluminum cans from within receptacles.

2. Description of the Prior Art

Tong structure of various types are utilized throughout the prior an and exemplified by the U.S. Pat. Nos. 4,606,569 and 4,972,672. U.S. Pat. No. 4,682,803 to Andrews indicates fish tongs having cooperate arcuate plate-like teeth members.

The present invention attempts to overcome deficiencies of the prior art by providing for generally plate-like facing teeth having planar confronting faces arranged for projection into various refuse receptacles for retrieving aluminum cans therefrom and in this respect, the present invention substantially fulfills this need.

SUMMARY OF THE INVENTION

In view of the disadvantages inherent in the known types of tong apparatus now present in the prior art, the present invention provides aluminum can handling tongs wherein the same is arranged for projection within a container for the grasping and retrieving of aluminum cans therefrom.

To attain this, the present invention provides first and second legs pivotally mounted in a scissor-like relationship about an adjustable pivot axle, wherein an outermost end of the legs have cooperative first and second jaws having facing mirror image surfaces arranged to secure aluminum cans.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is an object of the present invention to provide new aluminum can handling tongs which may be easily and efficiently manufactured and marketed.

It is a further object of the present invention to provide new aluminum can handling tongs which is of a durable and reliable construction.

An even further object of the present invention is to provide new aluminum can handling tongs which is susceptible of a low cost of manufacture with regard to both materials and labor, and which accordingly is then susceptible of low prices of sale to the consuming public, thereby making such aluminum can handling tongs economically available to the buying public.

Still yet another object of the present invention is to provide new aluminum can handling tongs which provides in the apparatuses and methods of the prior art some of the advantages thereof,, while simultaneously overcoming some of the disadvantages normally associated therewith.

Even still yet another object of the present invention is to provide new aluminum can handling tongs which include first and second legs pivotally mounted in a scissor-like relationship about an adjustable pivot axle, wherein an outermost end of the legs have cooperative first and second jaws having facing mirror image surfaces arranged to secure aluminum cans.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the invention.

FIG. 2 is an orthographic view, taken from the lines 2—2 of FIG. 1 in the direction indicated by the arrows.

FIG. 3 is an isometric illustration of the invention, including replaceable jaw members as well as extension tubes mounted to the cooperative leg structure.

DESCRIPTION OF THE PREFERRED EMBODIMENT

With reference now to the drawings, and in particular to FIGS. 1–3 thereof, a new aluminum can handling tongs embodying the principles and concepts of the present invention will be described.

More specifically, the aluminum can handling tongs of the instant invention comprises first and second legs 11 and 12 pivotally mounted relative to one another in a scissor-like arrangement about a pivot axle 13 that is adjustably positioned through cooperating first and second leg axle bores 16 and 17 of a linear array of such axle bores relative to each respective first and second legs 11 and 12 to permit varying the mechanical advantage in positioning the axle 13 through the first and second legs. First and second leg handles 14 and 15 are mounted at first ends of the respective first and second legs 11 and 12, with return spring members 18 mounted between the first and second legs 11 and 12 to bias respective first and second jaw plates 19 and 20 together.

First and second jaw plates 19 and 20 are mounted at respective second ends of the first and second legs, as shown in FIG. 1. The first and second jaw plates 19 and 20 are of a mirror image configuration relative to one another, having respective confronting first and second jaw planar faces 21 and 22. The linear and generally triangular cross-sectional configuration of the jaws indicated in FIG. 1 provides ease of piercing of the jaws into aluminum cans present within a bin, such as a refuse bin, for retrieving such aluminum cans therefrom. As best shown only for the second jaw 20 in FIG. 2, each of the jaws further includes a linear array of teeth members 23 at its outermost end to enhance ease of projection through various components within a refuse bin.

Attention is directed to the recesses 30 formed in each of the first and second legs 11 and 12 and positioned medially between the jaws 19 and 20 and the pivot axle 13. The recesses 30 are arcuate in shape and are operable to partially encompass and secure therebetween an aluminum can. Accordingly, the recesses 30 may have a radius of curvature equal to that typically defined by an outer circumference of a common twelve ounce beverage can, for example.

The FIG. 3 indicates the use of first and second leg grooves 25 and 24 respectively mounted to the respective first and second legs adjacent the axle 13 between the axle and the jaws 19 and 20 to provide for mounting of resilient bands 26 about pairs of individual first and second leg grooves 25 and 24. FIG. 3 further illustrates the use of angled jaws 19*a* and 20*a* which are of generally L-shaped configuration and are threadedly mounted to a threaded boss 31 and 32 formed on respective first and second legs 11 and 12. The angled jaws 19*a* and 20*a* may be employed for ease of grasping of aluminum cans present within a refuse bin.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. Aluminum can handling tongs comprising:

a first leg having a linear array of first axle bores, the first leg further having a first leg first end and a first leg second end, the first leg second end having a first threaded boss;

a second leg having a linear array of second axle bores, the second leg further having a second leg first end and a second leg second end, the second leg second end having a second threaded boss;

an axle removably positioned through one of said first axle bores and one of said second axle bores to pivotally couple the first leg and the second leg together;

a first leg handle mounted to the first leg first end;

a second leg handle mounted to the second leg first end;

a first jaw mounted to the first threaded boss, the first jaw including an outer periphery of first teeth in a linear array;

a second jaw mounted to the second threaded boss, the second jaw having a second array of linear teeth, wherein the first jaw and the second jaw are of a mirror image configuration relative to one another;

at least one return spring member extending between the first and second legs and positioned so as to reside between the jaws and the axle such that a tensioning of the spring operates to bias respective first and second jaws together.

2. The tongs as set forth in claim 1, wherein the first leg includes a first recess formed between the first threaded boss and the first axle bores, and the second leg includes a second recess formed between the second threaded boss and the second axle bores, the recesses being arcuate in shape and operable to partially encompass and secure therebetween a cylindrical can.

3. The tongs as set forth in claim 2, wherein the recesses have a radius of curvature substantially equal to that defined by an outer circumference of a twelve ounce beverage can.

4. The tongs as set forth in claim 3, wherein the first and second jaws are of a generally L-shaped configuration.

5. Aluminum can handling tongs comprising:

a first leg having a linear array of first axle bores, the first leg further having a first leg first end and a first leg second end, the first leg second end having a first threaded boss;

a second leg having a linear array of second axle bores, the second leg further having a second leg first end and a second leg second end, the second leg second end having a second threaded boss, the first leg including a first recess formed between the first threaded boss and the first axle bores, and the second leg includes a second recess formed between the second threaded boss and the second axle bores, the recesses being arcuate in shape and operable to partially encompass and secure therebetween a cylindrical can, the recesses having a radius of curvature substantially equal to that defined by an outer circumference of a twelve ounce beverage can;

an axle removably positioned through one of said first axle bores and one of said second axle bores to pivotally couple the first leg and the second leg together;

a first leg handle mounted to the first leg first end;

a second leg handle mounted to the second leg first end;

a first jaw mounted to the first threaded boss, the first jaw including an outer periphery of first teeth in a linear array;

a second jaw mounted to the second threaded boss, the second jaw having a second array of linear teeth, wherein the first jaw and the second jaw are of a mirror image configuration relative to one another, the first and second jaws being of a generally L-shaped configuration;

at least one return spring member mounted between the first and second legs to bias respective first and second jaws together;

wherein the first leg includes a plurality of first annular grooves positioned between the axle bores and the first threaded boss, and the second leg includes a plurality of second annular grooves positioned between the axle bores and the second threaded boss, wherein each of said first annular grooves and each of said second annular grooves includes a removable resilient band received therewithin to adjustably bias the first leg to the second leg.

* * * * *